United States Patent [19]

Feige

[11] 4,142,664
[45] Mar. 6, 1979

[54] METHOD OF JOINING TITANIUM CLAD STEEL PLATES

[75] Inventor: Norman G. Feige, South Salem, N.Y.

[73] Assignee: Titanium Fabrication Corporation, Fairfield, N.J.

[21] Appl. No.: 835,466

[22] Filed: Sep. 21, 1977

[51] Int. Cl.² ............................................. B23K 31/02
[52] U.S. Cl. .................................. 228/165; 228/187; 228/226
[58] Field of Search ............... 228/165, 184, 187, 226, 228/176; 219/76.12; 138/142, 143; 220/3

[56] References Cited

U.S. PATENT DOCUMENTS

| | | | |
|---|---|---|---|
| 2,158,799 | 5/1939 | Larson | 219/76.12 |
| 3,457,961 | 7/1969 | Long | 220/3 X |
| 3,474,344 | 10/1969 | Perl | 228/184 |
| 3,596,793 | 8/1971 | Kocher et al. | 220/63 R |
| 4,030,849 | 6/1977 | Keifert et al. | 228/165 X |
| 4,047,656 | 9/1977 | McCombs | 228/27 |
| 4,073,427 | 2/1978 | Keifert et al. | 228/165 |

FOREIGN PATENT DOCUMENTS 898927  6/1962  United Kingdom ..................... 228/186

OTHER PUBLICATIONS

"Explosive Bonding," *DMIC Memorandum* 225, 9/15/67, Battelle Memorial Institute; Columbus, Ohio, pp. 25-27.
"The Joining of Dissimilar Metals," *DMIC Report* S-16, Jan. 1968, Battelle Memorial Institute.

Primary Examiner—Harold D. Whitehead
Assistant Examiner—K. Ramsey
Attorney, Agent, or Firm—Wheeler, Morsell, House & Fuller

[57] ABSTRACT

A method of butt welding titanium-clad steel plates whereby the steel portions of the abutting plates are first welded together, then the portions of the steel plates adjacent to the titanium portions are metallized with a refractory metal coating, which coating is compatible both with the steel layer and with the titanium portions, then titanium is cast into the space between the titanium plates by a known method to complete a butt weld between the titanium clad steel plates, having continuous titanium and steel segments.

3 Claims, 2 Drawing Figures

METHOD OF JOINING TITANIUM CLAD STEEL PLATES

BACKGROUND OF THE INVENTION

The method of this disclosure relates to the art of welding titanium-clad steel plates in abutting relation to facilitate the construction of complex structures from titanium-clad steel plates. More specifically, this invention relates to a method for forming a butt joint between two titanium-clad steel plates in such fashion that the respective titanium and steel portions of such plates are welded along their entire abutting edges, while preventing intermixing of the titanium and steel portions in order to avoid the formation of ferrous titanium compounds, which greatly weaken the weld.

DESCRIPTION OF THE PRIOR ART

The Defense Metals Information Center Report No. S-16 of January, 1968, entitled: "The Joining of Dissimilar Metals", pages 22-25, depicts several prior art methods for joining titanium-clad steel plates in abutting relation. As shown in the diagrams on page 23, the adjacent steel plates are first joined by conventional welding methods. Several holes are then drilled in the region of the steel weld in order to provide communication between the titanium side and the exposed side of the steel portion of the clad plates. A titanium batten strip is then bridged between the two nearly abutting titanium portions of said plates and welded to each said titanium portion. In these prior art methods, it is necessary to flush the area under the titanium batten with argon gas in order to facilitate the welding of said batten to the titanium portions of the clad plates. In addition, the provision of a number of holes through the steel weld is necessary in order to allow inspection of the welds between the titanium portions and the titanium batten strip. The space below the titanium batten, which connects with the holes in the steel weld, is filled with some material in order to seal the welded plates together.

The disadvantages of this prior art method are three. First, the holes drilled in the steel weld breach the integrity of such weld and weaken the weld. Second, the area under the titanium batten does not contribute to the strength of the bond as a whole. Third, the technique is complex, expensive, and usuable only by persons who are very knowledgeable in the art of batten strip welding techniques.

SUMMARY OF THE INVENTION

In the present invention, the facing edges of the clad plates are prepared so that the steel edges abut and so that the titanium edges are somewhat more separated. The steel edges are then welded together across their entire width by conventional fusion welding techniques. Next, the steel surface which is exposed on the titanium side of the clad plates is metallized with a layer of a refractory metal such as molybdenum, tungsten, or tantalum. This metallized layer is made of a material which will bond both to titanium and to steel with acceptable bonding characteristics. The metallized layer overlaps the titanium portions of the clad plates slightly in order to prevent any contact between steel and titanium surfaces. Finally, the titanium portions are joined by casting titanium on the metallized layer using conventional heliarc fusion welding techniques. During the casting step, the steel portions of the clad plates are cooled in order to keep the refractory metal layer sufficiently cool to prevent excessive mixing of titanium and refractory metal, or of refractory metal and steel.

It is an object of this invention to provide a method to produce relatively smooth strong welded joints between abutting titanium-clad steel plates.

It is a further object of this invention to provide a method to fabricate titanium-clad steel plates into more complex structures, while avoiding the admixture of titanium and steel layers to create nonductile, objectionable compounds of titanium and iron which weaken the weld between clad plates.

Further objects of this invention will become apparent upon consideration of the specification and drawing set forth herein.

DESCRIPTION OF THE PREFERRED EMBODIMENTS

Figure 1:
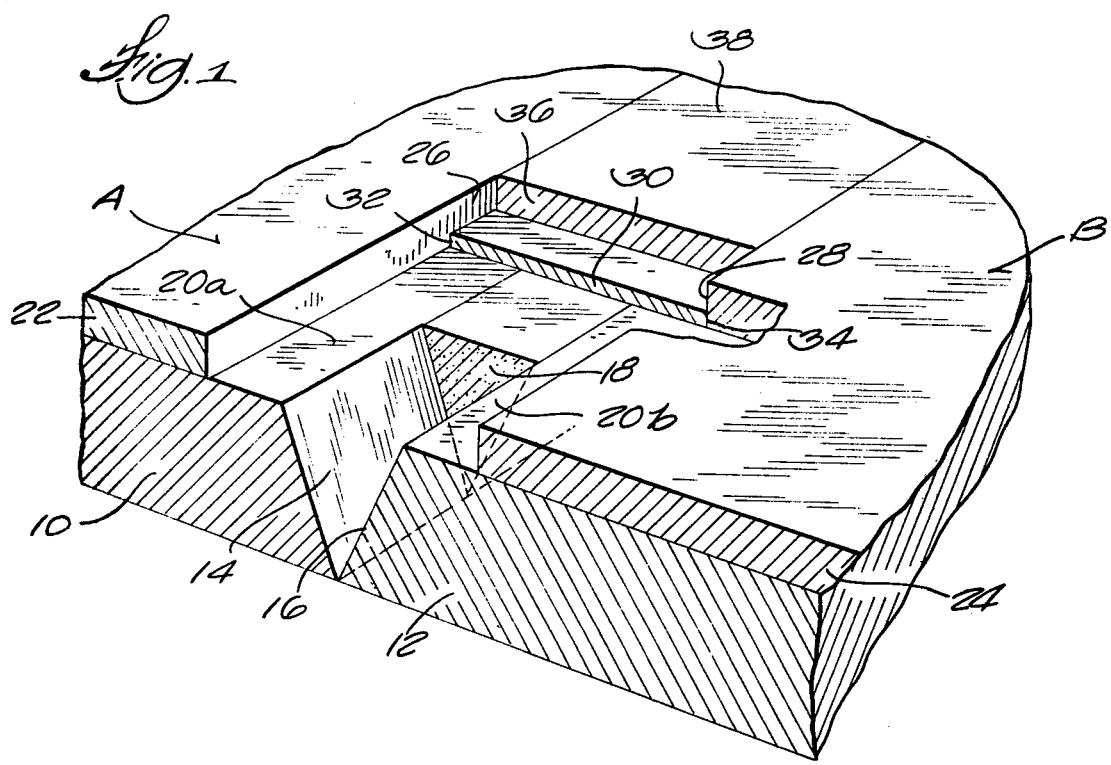
FIG. 1 is a side cross-sectional view of a 180° butt joint made according to the method disclosed herein.
Figure 2:
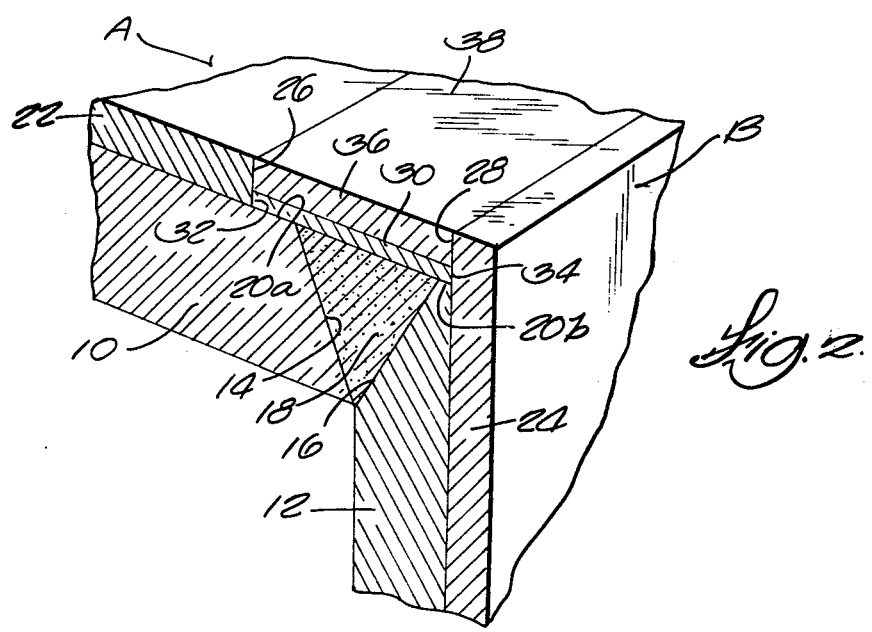
FIG. 2 is a side cross-sectional view of a 90° butt joint made according to the method disclosed herein.

The reference numbers of FIG. 1 correspond to similarly numbered features of FIG. 2.

Titanium can be clad to steel by explosive welding, roll cladding, welding, and brazing. Explosive welding is the most accepted practice to date, although the invention is not limited to plates clad in this manner.

Clad plate A is comprised of steel portion 10 and titanium portion 22. Clad plate B is comprised of steel portion 12 and titanium portion 24. Clad plate A has an abutting steel edge 14, a titanium facing edge 26, and an exposed steel face portion 20a. Clad plate B has an abutting steel edge 16, a titanium facing edge 28, and an exposed steel face portion 20b.

To join clad plate A and clad plate B in a butt joint, the plates are aligned so that abutting steel edges 14 and 16 intimately contact each other. Edge 26 of titanium portion 22 and edge 28 of titanium portion 24 are dressed to form a recess between such titanium facing edges 26 and 28, said recess being further bounded by exposed steel face portion 20 and by plane 38. Plane 38 generally follows the outer contour of clad plates A and B. The steel plates are welded at 18.

Next, exposed steel face 20, lower edge 32 of titanium facing edge 26, and lower edge 34 of titanium facing edge 28 are metallized with a coating of refractory metal. Specifically, this metal may be molybdenum, tungsten, or tantalum — the essential properties of the refractory metal are its melting point, which is higher than the melting point of titanium, and its ability to form ductile solutions with titanium and with iron. In addition, this metallized layer 30 isolates titanium portions 22 and 24 from steel portions 10 and 12, and it further isolates exposed steel face 20 from the titanium which will fill the recess between edges 26 and 28 and layer 30 when the weld is completed.

Finally, the joint is completed by casting titanium 36 into the recess in order to bond titanium facing edges 26 and 28 and metallized layer 30 together, while filling said recess to create a smooth outer surface at plane 38. The titanium is cast into the recess using conventional heliarc fusion welding techniques. Multiple passes are generally required to cast sufficient metal in the recess to match the clad thickness of titanium portions 22 and 24.

Concurrently with the casting of such titanium, cooling means are applied to steel portions 10 and 12 in order to keep the metallized layer 30 well below its melting point so that excessive admixture of metallized layer 30 with the material at titanium facing edges 26 and 28 and at exposed steel face 20 is minimized.

As a result of the aforesaid process, clad plates A and B are joined by welding along substantially the entire titanium facing edges 26 and 28, and weld 18 joins the entirety of abutting scarfed steel edges 14 and 16. At the same time, in no part of the completed bond does iron surface contact a titanium surface because of layer 30. As a result, a strong weld is formed, having uninterrupted steel and titanium faces, without the formation of undesirable iron alloys.

In FIG. 2 the identical method is applied to a weld wherein the clad plates A and B are joined at a 90° angle. It is further to be understood that the process disclosed herein is well adapted to the formation of butt joints having obtuse or acute angles between clad plates A and B. The reference characters are the same, only the orientation is different. As before, the weld scarf is so formed as to leave steel surfaces 20a and 20b separating titanium layers 22 and 24 from weld 18, and titanium edges 26 and 28 projecting higher to form a recess 30 for cast titanium to join layers 22 and 24.

Although the disclosure hereof is detailed and exact to enable those skilled in the art to practice the invention, the physical embodiments herein disclosed merely exemplify the invention which may be embodied in other specific structure. While the best known embodiment has been described, the details may be changed without departing from the invention, which is defined by the claims.

I claim:

1. A method of forming a joint between first and second titanium clad steel members comprised of the following steps:
   a. Scarfing said members so that the titanium layers are separated from the edges of the steel layers to be joined;
   b. Aligning said first and second members for welding with their steel portions in substantially abutting relation and their titanium portions separated and elevated therefrom;
   c. Welding only said abutting steel portions together;
   d. Metallizing the exposed steel surface and weld from one titanium-clad edge to the other titanium-clad edge with a refractory metal which is compatible with steel and with titanium;
   e. Filling the space bounded by the edges of the titanium-clad portions and the layer of refractory metal with titanium-bonded to the abutting surfaces while chilling the steel side of the joint; whereby the respective edges of said abutting steel and titanium portions are joined by a smooth full interface bond.

2. The method of claim 1, wherein said refractory metal is one member selected from the following group: molybdenum, tungsten, and tantalum.

3. The method of claim 1, wherein the refractory metal is deposited by metallizing.

* * * * *